United States Patent

Nojima et al.

Patent Number: 5,677,254
Date of Patent: Oct. 14, 1997

[54] CATALYST FOR PURIFYING AN EXHAUST GAS

[75] Inventors: Shigeru Nojima; Kozo Iida, both of Hiroshima; Norihisa Kobayashi, Chiyoda-ku; Satoru Serizawa; Atsushi Morii, both of Nagasaki, all of Japan

[73] Assignee: Mitsubishi Jukogyo Kabushiki Kaisha, Japan

[21] Appl. No.: 665,820

[22] Filed: Jun. 19, 1996

Related U.S. Application Data

[63] Continuation of Ser. No. 318,780, filed as PCT/JP94/00223, Feb. 15, 1994, abandoned.

[30] Foreign Application Priority Data

| Feb. 16, 1993 | [JP] | Japan | 5-026369 |
| Apr. 27, 1993 | [JP] | Japan | 5-100698 |
| Jan. 27, 1994 | [JP] | Japan | 6-007667 |
| Jan. 28, 1994 | [JP] | Japan | 6-008193 |

[51] Int. Cl.$^6$ ............... B01J 29/46; B01J 29/48
[52] U.S. Cl. ............... 502/65; 502/66; 502/71; 502/73; 502/74; 502/77; 423/239.2; 423/713
[58] Field of Search ............... 423/713, 718, 423/DIG. 22, DIG. 29; 502/65, 66, 71, 73, 74, 77

[56] References Cited

U.S. PATENT DOCUMENTS

| 3,702,886 | 11/1972 | Argauer | 423/DIG. 22 |
| 3,709,979 | 1/1973 | Chu | 423/DIG. 29 |
| 4,088,605 | 5/1978 | Rollmann | 423/75 |
| 4,208,305 | 6/1980 | Kouwenhoven et al. | 423/713 |
| 4,485,185 | 11/1984 | Onodera et al. | 502/71 |
| 4,681,747 | 7/1987 | Desmond et al. | 502/71 |
| 4,994,254 | 2/1991 | Suzuki et al. | 502/77 |
| 5,185,136 | 2/1993 | Vaughan et al. | |
| 5,206,196 | 4/1993 | Nakano et al. | 502/65 |
| 5,236,879 | 8/1993 | Inoue et al. | 502/74 |
| 5,318,934 | 6/1994 | Ueoka et al. | 502/71 |
| 5,338,715 | 8/1994 | Iida et al. | 502/74 |
| 5,409,671 | 4/1995 | Takemoto et al. | 502/65 |
| 5,413,976 | 5/1995 | Takami et al. | 502/74 |
| 5,489,561 | 2/1996 | Iwakuni et al. | 502/66 |
| 5,518,976 | 5/1996 | Itoh et al. | 502/66 |

FOREIGN PATENT DOCUMENTS

| 1127134 | 7/1982 | Canada . | |
| 0231860A2 | 8/1987 | European Pat. Off. . | |
| 0507656A1 | 10/1992 | European Pat. Off. . | |
| 4040328 | 2/1992 | Japan | 502/74 |
| 4219147 | 8/1992 | Japan | 502/73 |
| 4219149 | 8/1992 | Japan | 502/73 |
| 5076770 | 3/1993 | Japan | 502/74 |
| WO89/09185 | 10/1989 | WIPO . | |

Primary Examiner—Mark L. Bell
Assistant Examiner—David Sample
Attorney, Agent, or Firm—Wenderoth, Lind & Ponack

[57] ABSTRACT

This invention relates to a catalyst for purifying an exhaust gas, which has a denitrification property in the lean atmosphere and good durability and is hardly deteriorated even in a high temperature rich atmosphere. The feature thereof consists in a catalyst for purifying an exhaust gas, comprising a crystalline silicate having the specified X-ray diffraction pattern and a chemical composition represented by the following chemical formula in the term of mole ratios of oxides under dehydrated state, $$(1 \pm 0.8)R_2O \cdot [aM_2O_3 \cdot bM'O \cdot cAl_2O_3] \cdot ySiO_2$$

in which R is at least one of alkali metal ions and hydrogen ion, M is at least one elementary ion selected from the group consisting of Group VIII elements of Periodic Table, rare earth elements, titanium, vanadium, chromium, niobium, antimony and gallium, M' is an alkaline earth metal ion selected from magnesium, calcium, strontium and barium ions, $a>0$, $20>b\geq0$, $a+c=1$ and $3000>y>11$, on which (I) at least one member selected from platinum group metals and (II) at least one metal selected from platinum group metals and at least one metal selected from the group consisting of rare earth elements are supported.

4 Claims, No Drawings

CATALYST FOR PURIFYING AN EXHAUST GAS

This application is a continuation of now abandoned application, Ser. No. 08/318,780, filed Jan. 6, 1995, which is a 371 of PCT/JP94/00223, filed Feb. 15, 1994.

TECHNICAL FIELD

This invention relates to a catalyst for purifying an exhaust gas or a waste gas containing nitrogen oxides (hereinafter referred to as "$NO_x$"), carbon monoxide (CO) and hydrocarbons (hereinafter referred to as "HC").

BACKGROUND TECHNIQUE

The treatment of exhaust gases of automobiles, etc. is generally carried out by a catalyst of noble metal type, for example, a catalytic system of a noble metal supported on alumina utilizing CO and HC in the exhaust gas, but $NO_x$ is not purified only in a very narrow range in the vicinity of the stoichiometric air-fuel ratio. Of late, a requirement for lowering the fuel cost of a car becomes stronger with the increase of the global environmental problems and such a lean burn engine that combustion is effected with at least the stoichiometric air-fuel ratio has been watched with keen interest as a key technology. Considering the running property or accelerating property of a car, however, an engine operating in only the lean zone meets with many inconvenient points and it is really necessary to effect the combustion in both the vicinity of the stoichiometric air-fuel ratio and the lean zone. As to the purification of $NO_x$ in the lean zone, a crystalline silicate catalyst containing cobalt or copper has lately been spotlighted as a catalyst having a high performance.

These catalysts have sufficient catalytic functions at the initial reaction period, but have some problems in durability. Thus, various crystalline silicates have been researched and examined so as to improve the durability. For example, there have been proposed methods of using new silicates, in which Group VIII elements of Periodic Table or rare earth elements are incorporated in the crystalline lattice (Japanes Patent Laid-Open Publication No. 165816/1991) and in which alakline earth metals are added (Japanes Patent Application No. 319195/1991) in order to prevent release of aluminum as the main constitutional element of the crystalline silicate and to stabilize cobalt or copper. Furthermore, in order to prevent entrance of steam capable of accelerating release of aluminum, it has been studied to apply a crystalline silicate on the surface of which hydrophobic silicalite crystals are grown to improve the steam resistance (Japanese Patent Application No. 192829/1991).

However, the use of these catalysts results in that the durability is largely improved in the lean atmosphere, but in the case of accelerating, the gas temperature is instantaneously increased, during which the gas composition becomes a rich atmosphere in which a reducing agent such as hydrogen is excessively present. Under the situation, deterioration of the catalyst cannot be prevented even if the above described crystalline silicate of the improved type is applied and accordingly, the improvement of the durability of the catalyst in the rich atmosphere at a high temperature is a large problem on practical use of these catalysts.

The above described problem cannot be avoided as long as copper or cobalt is used as an active metal. Namely, the reason therefor is that base metal elements all sinter and aggregate at a high temperature, i.e. at least 700° C. Accordingly, it is considered that if other metals having denitrification property in the lean atmosphere than the base metals can be used by the use of the developed crystalline silicate, the durability can adequately be ensured to largely advance to practical use.

Accoringly, the principal object of the present invention is to provide a catalyst for purifying an exhaust gas, which has a denitrification property in the lean atmosphere and good durability and is hardly deteriorated even in a high temperature rich atmosphere.

DISCLOSURE OF THE INVENTION

The inventors have made various efforts to overcome the disadvantages of the prior art catalyst and attain the above described object and consequently, have found that a crystalline silicate catalyst carrying a platinum group element such as iridium has a denitrification property in the lean atmosphere and is hardly deteriorated even in a high temperature atmosphere of a rich condition. Furthermore, it is found, as a result of our various studies, that a catlyst containing at least one metal selected from the group consisting of rare earth elements in addition to platinum group elements, for example, iridium is effective for improving the denitrification property of the above described catalyst under a high oxygen concentration. The present invention has been accomplished based on these findings.

Accordingly, the present invention provides a catalyst for purifying an exhaust gas, comprising a crystalline silicate having an X-ray diffraction pattern represented by Table A and a chemical composition represented by the following general formula in the term of mole ratio under dehydrated state,

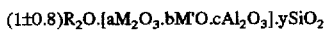

$$(1\pm0.8)R_2O\cdot[aM_2O_3\cdot bM'O\cdot cAl_2O_3]\cdot ySiO_2$$

in which R is at least one of alkali metal ions and hydrogen ion, M is at least one elementary ion selected from the group consisting of Group VIII elements of Periodic Table, rare earth elements, titanium, vanadium, chromium, niobium, antimony and gallium, M' is an alkaline earth metal ion selected from magnesium, calcium, strontium and barium ions, a>0, 20>b≧0, a+c=1 and 3000>y>11, (I) on which at least one member selected from platinum group metals (ruthenium, rhodium, palladium, osmium and platinum) is supported or (II) in which at least one metal selected from platinum group metals, in particular, iridium and at least one metal selected from the group consisting of rare earth elements are allowed to be co-existent.

BEST EMBODIMENT FOR CARRYING OUT PRESENT INVENTION

Purifying reaction equations for purifying an exhaust gas containing $NO_x$, CO and HC using a crystalline silicate supporting a platinum group element, used in the present invention, are ordinarily represented as follows:

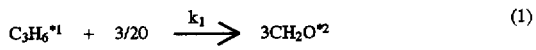

$$C_3H_6^{*1} + 3/2 O_2 \xrightarrow{k_1} 3CH_2O^{*2} \quad (1)$$

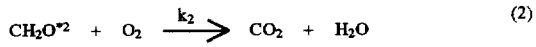

$$CH_2O^{*2} + O_2 \xrightarrow{k_2} CO_2 + H_2O \quad (2)$$

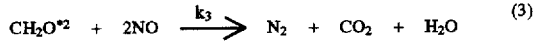

$$CH_2O^{*2} + 2NO \xrightarrow{k_3} N_2 + CO_2 + H_2O \quad (3)$$

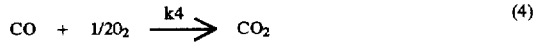

$$CO + 1/2 O_2 \xrightarrow{k_4} CO_2 \quad (4)$$

Note:
*1) $C_3H_6$ is shown as a typical example of hydrocarbons (HC).
*2) $CH_2O$ is shown as a typical example of oxygen-containing hydrocarbons.

The above described reaction equations mean (1) activation of HC, (2) combustion of HC, (3) denitrification and (4) combustion of CO.

All crystalline silicate catalysts supporting platinum group elements such as ruthenium, rhodium, palladium, osmium, iridium and platinum have an effect of forwarding the denitrification reaction by the above described reaction and above all, a iridium-supported crystalline silicate catalyst has a high denitrification property at 250° to 500° C. When at leat one metal selected from the group consisting of titanium, zirconium, chromium, manganese, iron, cobalt, zinc, aluminum, tin, nickel, copper, calcium, magnesium, strontium and barium is allowed to be coexistent with iridium, a high denitrification activity can similarly be given. It is found that the above described catalyst is a catalyst having durabilty without substantial change of the rate constants of $k_1$, $k_2$, $k_3$ and $k_4$, even if it is exposed to a high temperature lean or rich atmosphere at a temperature of at least 700° C.

In the case of the crystalline silicate of the present invention, in which a platinum group element, in particular, iridium and at least one metal selected from rare earth elements are supported, the denitrification reaction also proceeds by the above described reaction. The denitrification reaction (3) can more be accelerated even under a high oxygen concentration by the addition of the rare earth elements. It is further found that this catalyst is a catalyst having durabilty without substantial change of the rate constants of $k_1$, $k_2$, $k_3$ and $k_4$, even if it is exposed to a high temperature lean or rich atmosphere at a temperature of at least 700° C.

The crystalline silicate used in the present invention has an X-ray diffraction pattern represented by Table A and a chemical composition represented by the following general formula in the term of mole ratio under dehydrated state, $$(1\pm0.8)R_2O \cdot [aM_2O_3 \cdot bM'O \cdot cAl_2O_3] \cdot ySiO_2$$

in which R is at least one of alkali metal ions and hydrogen ion, M is at least one elementary ion selected from the group consisting of Group VIII elements of Periodic Table, rare earth elements, titanium, vanadium, chromium, niobium, antimony and gallium, M' is an alkaline earth metal ion selected from magnesium, calcium, strontium and barium ions, a>0, 20>b≧0, a+c=1 and 3000>y>11.

The above described crystalline silicate can be a laminar composite crystalline silicate composed of a matrix silicate of previously synthesized crystalline silicate and a crystalline silicate consisting of Si and O and having the same crystalline structure as the matrix crystal, grown on the outer surface of the matrix crystal. This laminar composite crystalline silicate has such an effect that only $H_2O$ is hard to be penetrated into the interior part of the crystalline silicate by the hydrophobic function of the crystalline silicate (called silicalite) consisting of Si and O, grown on the outer surface, and the concentration of $H_2O$ around the reaction active site of the catalyst is lowered to suppress the metal removal function. Accordingly, the structure of the crystalline silicate can be maintained even in a high temperature steam atmosphere, whereby the supporting effect of the platinum group element can be maintained and the catalyst is hardly deteriorated.

The platinum group element or the platinum group element and rare earth element can be supported on only the crystalline silicate used in the present invention in such a manner that the dispersion thereof is maintained uniform under any conditions and phenomena such as sintering, etc. are not found, unlike alumina supports or silica supports of the prior art.

TABLE A

| Spacing of Lattice Plane (d value) | Relative Intensity |
|---|---|
| 11.2 ± 0.3 | VS |
| 10.0 ± 0.3 | VS |
| 6.7 ± 0.2 | W |
| 6.4 ± 0.2 | M |
| 6.0 ± 0.2 | M |
| 5.7 ± 0.2 | W |
| 5.6 ± 0.2 | M |
| 4.6 ± 0.1 | W |
| 4.25 ± 0.1 | M |
| 3.85 ± 0.1 | VS |
| 3.75 ± 0.1 | S |
| 3.65 ± 0.1 | S |
| 3.3 ± 0.1 | M |
| 3.05 ± 0.1 | W |
| 3.0 ± 0.1 | M |

Note:
VS = very strong,
S = strong,
M = medium,
W = weak
X-ray Source = Cu K α

The catalyst of the present invention can be obtained by immersing the above described crystalline silicate in an aqueous solution of a platinum group metal salt and subjecting to an ion exchange method or an impregnation method. Supporting of iridium can also be carried out by an ion exchange method or impregnation method, and co-supporting with other metals can be carried out by the similar method.

The platinum group element supported is generally present in a proportion of at least 0.002 weight %, preferably at least 0.02 weight % to give a high activity.

Furthermore, the catalyst of the present invention can be produced by immersing the above described crystalline silicate in an aqueous solution of salts of a platinum group metal, in particular, iridium and a rare earth element and subjecting to an ion exchange method or an impregnation method. The iridium supported is generally present in a proportion of at least 0.002 weight % to realize a sufficient activity, preferably at least 0.02 weight % to give a high activity.

Examples of the rare earth element coexistent are lanthanum (La), cerium (Ce), praseodymium (Pr), neodymium (Nd), samarium (Sm), etc. At least 0.002 weight % of at least one of the rare earth elements is added to bring out a high activity.

The present invention will now be illustrated by the following examples without limiting the same.

EXAMPLE 1

SYNTHESIS OF MATRIX CRYSTAL 1

5616 g of Water Glass No. 1 ($SiO_2$:30 %) was dissolved in 5429 g of water to prepare Solution A, while 718.9 g of aluminum sulfate, 110 g of ferric chloride, 47.2 g of calcium acetate, 262 g of sodium chloride and 2020 g of concentrated hydrochloric acid were dissolved in 4175 g of water to prepare Solution B. Solution A and Solution B were fed with a constant ratio to form a precipitate and adequately stirred to obtain a slurry with a pH of 8.0. This slurry was charged in an autoclave of 20 liters, to which 500 g of tetrapropylammonium bromide was added. The resulting mixture was subjected to hydrothermal synthesis at 160° C. for 72 hours, then rinsed with water, dried and calcined at 500° C. for 3 hours to thus obtain Crystalline Silicate 1. This Crystalline Silicate 1 was represented by the following composition in the term of mole ratios of oxides (exclusive of crystallization water), whose crystalline structure was represented by X-ray diffraction pattern as shown in Table A:

$$0.5Na_2O.0.5H_2O.[0.8Al_2O_3.0.2Fe_2O_3.0.25CaO].25SiO_2$$

SYNTHESIS OF LAMINAR COMPOSITE CRYSTALLINE SILICATE 1

1000 g of the above described Matrix Crystal 1 (Crystalline Silicate 1), finely pulverized, was added to 2160 g of water, to which 4590 g of colloidal silica ($SiO_2$:20%) was further added, and the mixture was adequately stirred to obtain Solution a. On the other hand, 105.8 g of sodium hydroxide was dissolved in 2008 g of water to obtain Solution b. Solution b was gradually dropwise added to Solution a with agitation to form a precipitate, thus obtaining a slurry. This slurry was charged in an autoclave, to which a solution of 568 g of tetrapropylammonium bromide dissolved in 2106 g of water was then added. The mixture was subjected to hydrothermal synthesis in this autoclave at 160° C. for 72 hours while stirring at 200 rpm, then rinsed, dried and calcined at 500° C. for 3 hours to obtain Laminar Composite Crystalline Silicate 1.

The above described Laminar Composite Crystalline Silicate 1 was stirred in a 4N aqueous solution of $NH_4Cl$ at 40° C. for 3 hours to effect $NH_4$ ion exchange. After the ion exchange, the silicate was washed, dried at 100° C. for 24 hours and calcined at 400° C. for 3 hours to obtain Laminar Composite Crystalline Silicate 1 of H-type.

PREPARATION OF CATALYST

To 100 parts of Laminar Composite Crystalline Silicate 1 of H-type were then added, as a binder, 3 parts of alumina sol, 55 parts of silica sol ($SiO_2$:20%) and 200 parts of water, and the mixture was adequately stirred to prepare a slurry for wash-coating. A monolithic substrate for coordielite (lattice of 400 cells per square inch) was immersed in the above described slurry, withdrawn therefrom, subjected to wiping-off of the excessive slurry and then dried at 200° C. The coating amount was adjusted to 200 g per 1 liter of the substrate and the resulting coated article is called Honeycomb Coated Article 1.

The above described Honeycomb Coated Article 1 was then immersed in iridium choride ($IrCl_4.H_2O$ 2.88 g/$H_2O$ 200 cc), impregnated therewith for 1 hour, subjected to wiping-off of the liquid adhered to the wall of the substrate, dried at 200° C. and then subjected to a purging treatment in a nitrogen atmosphere for 12 hours to obtain Honeycomb Catalyst 1.

EXAMPLE 2

The synthesis of Matrix Crystal 1 in Example 1 was repeated except using cobalt chloride, ruthenium chloride, rhodium chloride, lanthanum chloride, cerium chloride, titanium chloride, vanadium chloride, chromium chloride, antimony chloride, gallium chloride and niobium chloride in the same amount as $Fe_2O_3$ in the term of mole ratio of oxide, instead of the ferric chloride, thus obtaining Matrix Crystals 2 to 12. The crystalline structure of these matrix crystals is represented by the X-ray diffraction as shown in Table A, which have each a chemical composition represented by the following general formula in the term of mole ratios of oxides under dehydrated state, $$(1\pm0.8)R_2O.[0.2M_2O_3.0.8Al_2O_3.0.25CaO].25SiO_2$$

in which R is Na or H and M is Co, Ru, Rh, La, Ce, Ti, V, Cr, Sb, Ga or Nb. The constructions of these matrix crystals are shown in Table B.

The Matrix Crystals 2 to 12 were finely pulverized and subjected to hydrothermal synthesis using an autoclave in the similar manner to the synthesis of Laminar Composite Crystalline Silicate 1 in Example 1 except using Matrix Crystals 2 to 12 instead of Matrix Crystal 1, thus obtaining Laminar Composite Crystalline Silicates 2 to 12.

The synthesis of Matrix Crystal 1 in Example 1 was repeated except using magnesium acetate, strontium acetate and barium acetate in the same amount as CaO in the term of mole ratio of oxide, instead of the calcium acetate, thus obtaining Matrix Crystals 13 to 15. The crystalline structure of these matrix crystals is represented by the X-ray diffraction as shown in Table A, which have each a chemical composition represented by the following general formula in the term of mole ratios of oxides under dehydrated state, $$0.5Na_2O.0.5H_2O(0.2Fe_2O_3.0.8Al_2O_3.0.2MeO).25SiO_2$$

in which Me is Mg, Sr or Ba.

The Matrix Crystals 13 to 15 were finely pulverized and subjected to hydrothermal synthesis using an autoclave in the similar manner to the synthesis of Laminar Composite Crystalline Silicate 1 in Example 1, thus obtaining Laminar Composite Crystalline Silicates 13 to 15.

Using the above described Laminar Composite Crystalline Silicates 2 to 15, H-type Laminar Composite Crystalline Silicates 2 to 15 were obtained in an analogous manner to Example 1 and coated on a monolithic substrate for coordielite in the similar step to that for the preparation of the catalyst of Example 1, thus obtaining Honeycomb Coated Articles 2 to 15. The resulting Honeycomb Coated Articles were then immersed in the aqueous solution of iridium chloride and treated in the similar manner to Example 1, thus obtaining Honeycomb Catalysts 2 to 15.

EXAMPLE 3

Using Matrix Crystals 1 to 15 obtained in Examples 1 and 2, H-type Crystalline Silicates 16 to 30 were obtained in an analogous manner to Example 1 and further treated in the similar step to that for the preparation of the catalyst of Example 1 to obtain Honeycomb Coated Articles and Honeycomb Catalysts 16 to 30.

EXAMPLE 4

Matrix Crystals 1 to 15 obtained in Examples 1 and 2 (no formation of laminar composite crystal, nor ion exchange) were coated on a monolithic substrate for coordielite, thus obtaining Honeycomb Coated Articles 31 to 45, which were then immersed in the aqueous solution of iridium chloride in the similar manner to Example 1, thus obtaining Honeycomb Catalysts 31 to 45.

EXAMPLE 5

Honeycomb Coated Article 1 coated with Laminar Composite Crystalline Silicate 1 obtained in Example 1 was immersed in each of aqueous solutions of ruthenium chloride ($RuCl_3$ 2 g/$H_2O$ 200 cc), rhodium chloride ($RhCl_3$ 2 g/$H_2O$ 200 cc), palladium nitrate ($Pd(NO_3)_2$ 2 g/$H_2O$ 200 cc), osmium nitrate ($Os(NO_3)$ 2 g/$H_2O$ 200 cc) and chloroplatinic acid ($H_2PtCl_6$ 2 g/$H_2O$ 200 cc) and then subjected to formation of the catalysts in an analogous manner to Example 1, thus obtaining Honeycomb Catalysts 46 to 50.

EXAMPLE 6

Honeycomb Coated Article 1 coated with Laminar Composite Crystalline Silicate 1 obtained in Example 1 was immersed in each of aqueous solutions of iridium chloride and aluminum chloride ($IrCl_4 \cdot H_2O$ 2.88 g, $Al_2O_3 \cdot 6H_2O$ 6.0 g/$H_2O$ 200 cc), iridium chloride and titanium chloride ($IrCl_4 \cdot H_2O$ 2.88 g, $TiCl_4$ 7.5 g/$H_2O$ 200 cc), iridium chloride and tin chloride ($IrCl_4 \cdot H_2O$ 2.88 g, $SnCl_4$ 7 g/$H_2O$ 200 cc), iridium chloride and chromium nitrate ($IrCl_4 \cdot H_2O$ 2.88 g, $Cr(NO_3)_2$ 6.0 g/$H_2O$ 200 cc), iridium chloride and zirconium tetrachloride ($IrCl_4 \cdot H_2O$ 2.88 g, $ZrCl_4$ 6 g/$H_2O$ 200 cc), iridium chloride and cobalt chloride ($IrCl_4 \cdot H_2O$ 2.88 g, $CoCl_2 \cdot 6H_2O$ 7 g/$H_2O$ 200 cc), iridium chloride and manganese chloride ($IrCl_4 \cdot H_2O$ 2.88 g, $MnCl_2$ 20 g/$H_2O$ 200 cc), iridium chloride and iron chloride ($IrCl_4 \cdot H_2O$ 2.88 g, $FeCl_3 \cdot 6H_2O$ 7 g/$H_2O$ 200 cc), iridium chloride and nickel chloride ($IrCl_4 \cdot H_2O$ 2.88 g, $NiCl_2 \cdot 6H_2O$ 8 g/$H_2O$ 200 cc), iridium chloride and calcium chloride ($IrCl_4 \cdot H_2O$ 2.88 g, $CaCl_2 \cdot 2H_2O$ 6 g/$H_2O$ 200 cc), iridium chloride and magnesium chloride ($IrCl_4 \cdot H_2O$ 2.88 g, $MgCl_2 \cdot 6H_2O$ 11 g/$H_2O$ 200 cc), iridium chloride and barium chloride ($IrCl_4 \cdot H_2O$ 2.88 g, $BaCl_2 \cdot 2H_2O$ 14 g/$H_2O$ 200 cc), iridium chloride and strontium chloride ($IrCl_4 \cdot H_2O$ 2.88 g, $SrCl_2 \cdot 6H_2O$ 13 g/$H_2O$ 200 cc), iridium chloride and cupric chloride ($IrCl_4 \cdot H_2O$ 2.88 g, $CuCl_2 \cdot 2H_2O$ 10 g/$H_2O$ 200 cc) and iridium chloride and zinc chloride ($IrCl_4 \cdot H_2O$ 2.88 g, $ZnCl_2$ 6 g/$H_2O$ 200 cc), and then subjected to formation of the catalysts in an analogous manner to Example 1, thus obtaining Honeycomb Catalysts 51 to 65.

COMPARATIVE EXAMPLE 1

$\alpha$-$Al_2O_3$ was honeycomb-coated in an analogous manner to Example 1 and iridium, ruthenium, rhodium, palladium, osmium or platinum was supported on the $\alpha$-$Al_2O_3$ in the similar manner to Examples 1 and 4 to prepare Honeycomb Catalysts 66 to 71.

The constructions of the catalysts of Examples of the present invention and Comparative Examples are shown in Tables B:

TABLE B

| Honeycomb Catalyst No. | Supported *1) Amount of Activator (wt %) | No. | Crystalline Silicate Composition *2) |
|---|---|---|---|
| 1 | Ir (0.6) | 1 | S.L/0.5Na$_2$O · 0.5H$_2$O(0.2Fe$_2$O$_3$ · 0.8Al$_2$O$_3$ · 0.25CaO) |
| 2 | Ir (0.6) | 2 | S.L/0.5Na$_2$O · 0.5H$_2$O(0.2Co$_2$O$_3$ · 0.8Al$_2$O$_3$ · 0.25CaO) |
| 3 | Ir (0.6) | 3 | S.L/0.4Na$_2$O · 0.5H$_2$O(0.2Ru$_2$O$_3$ · 0.8Al$_2$O$_3$ · 0.25CaO) |
| 4 | Ir (0.6) | 4 | S.L/0.5Na$_2$O · 0.4H$_2$O(0.2Rh$_2$O$_3$ · 0.8Al$_2$O$_3$ · 0.25CaO) |
| 5 | Ir (0.6) | 5 | S.L/0.5Na$_2$O · 0.5H$_2$O(0.2La$_2$O$_3$ · 0.8Al$_2$O$_3$ · 0.25CaO) |
| 6 | Ir (0.6) | 6 | S.L/0.6Na$_2$O · 0.4H$_2$O(0.2Ce$_2$O$_3$ · 0.8Al$_2$O$_3$ · 0.25CaO) |
| 7 | Ir (0.6) | 7 | S.L/0.5Na$_2$O · 0.6H$_2$O(0.2Ti$_2$O$_3$ · 0.8Al$_2$O$_3$ · 0.25CaO) |
| 8 | Ir (0.6) | 8 | S.L/0.4Na$_2$O · 0.6H$_2$O(0.2V$_2$O$_3$ · 0.8Al$_2$O$_3$ · 0.25CaO) |
| 9 | Ir (0.6) | 9 | S.L/0.5Na$_2$O · 0.6H$_2$O(0.2Cr$_2$O$_3$ · 0.8Al$_2$O$_3$ · 0.25CaO) |
| 10 | Ir (0.6) | 10 | S.L/0.6Na$_2$O · 0.4H$_2$O(0.2Sb$_2$O$_3$ · 0.8Al$_2$O$_3$ · 0.25CaO) |
| 11 | Ir (0.6) | 11 | S.L/0.6Na$_2$O · 0.5H$_2$O(0.2Ga$_2$O$_3$ · 0.8Al$_2$O$_3$ · 0.25CaO) |
| 12 | Ir (0.6) | 12 | S.L/0.5Na$_2$O · 0.5H$_2$O(0.2Nb$_2$O$_3$ · 0.8Al$_2$O$_3$ · 0.25CaO) |
| 13 | Ir (0.6) | 13 | S.L/0.5Na$_2$O · 0.5H$_2$O(0.2Fe$_2$O$_3$ · 0.8Al$_2$O$_3$ · 0.25MgO) |
| 14 | Ir (0.6) | 14 | S.L/0.5Na$_2$O · 0.5H$_2$O(0.2Fe$_2$O$_3$ · 0.8Al$_2$O$_3$ · 0.25SrO) |
| 15 | Ir (0.6) | 15 | S.L/0.5Na$_2$O · 0.5H$_2$O(0.2Fe$_2$O$_3$ · 0.8Al$_2$O$_3$ · 0.25BaO) |
| 16 | Ir (0.6) | 16 | 0.5Na$_2$O · 0.5H$_2$O(0.2Fe$_2$O$_3$ · 0.8Al$_2$O$_3$ · 0.25CaO) |
| 17 | Ir (0.6) | 17 | 0.5Na$_2$O · 0.5H$_2$O(0.2Co$_2$O$_3$ · 0.8Al$_2$O$_3$ · 0.25CaO) |
| 18 | Ir (0.6) | 18 | 0.4Na$_2$O · 0.5H$_2$O(0.2Ru$_2$O$_3$ · 0.8Al$_2$O$_3$ · 0.25CaO) |
| 19 | Ir (0.6) | 19 | 0.5Na$_2$O · 0.4H$_2$O(0.2Rh$_2$O$_3$ · 0.8Al$_2$O$_3$ · 0.25CaO) |
| 20 | Ir (0.6) | 20 | 0.5Na$_2$O · 0.5H$_2$O(0.2La$_2$O$_3$ · 0.8Al$_2$O$_3$ · 0.25CaO) |
| 21 | Ir (0.6) | 21 | 0.6Na$_2$O · 0.4H$_2$O(0.2Ce$_2$O$_3$ · 0.8Al$_2$O$_3$ · 0.25CaO) |
| 22 | Ir (0.6) | 22 | 0.5Na$_2$O · 0.6H$_2$O(0.2Ti$_2$O$_3$ · 0.8Al$_2$O$_3$ · 0.25CaO) |
| 23 | Ir (0.6) | 23 | 0.4Na$_2$O · 0.6H$_2$O(0.2V$_2$O$_3$ · 0.8Al$_2$O$_3$ · 0.25CaO) |
| 24 | Ir (0.6) | 24 | 0.5Na$_2$O · 0.6H$_2$O(0.2Cr$_2$O$_3$ · 0.8Al$_2$O$_3$ · 0.25CaO) |
| 25 | Ir (0.6) | 25 | 0.6Na$_2$O · 0.4H$_2$O(0.2Sb$_2$O$_3$ · 0.8Al$_2$O$_3$ · 0.25CaO) |
| 26 | Ir (0.6) | 26 | 0.6Na$_2$O · 0.5H$_2$O(0.2Ga$_2$O$_3$ · 0.8Al$_2$O$_3$ · 0.25CaO) |
| 27 | Ir (0.6) | 27 | 0.5Na$_2$O · 0.5H$_2$O(0.2Nb$_2$O$_3$ · 0.8Al$_2$O$_3$ · 0.25CaO) |
| 28 | Ir (0.6) | 28 | 0.5Na$_2$O · 0.5H$_2$O(0.2Fe$_2$O$_3$ · 0.8Al$_2$O$_3$ · 0.25MgO) |
| 29 | Ir (0.6) | 29 | 0.5Na$_2$O · 0.5H$_2$O(0.2Fe$_2$O$_3$ · 0.8Al$_2$O$_3$ · 0.25SrO) |
| 30 | Ir (0.6) | 30 | 0.6Na$_2$O · 0.4H$_2$O(0.2Fe$_2$O$_3$ · 0.8Al$_2$O$_3$ · 0.25BaO) |
| 31 | Ir (0.6) | (1)** | 0.5Na$_2$O · 0.4H$_2$O(0.2Fe$_2$O$_3$ · 0.8Al$_2$O$_3$ · 0.25CaO) |
| 32 | Ir (0.6) | (2) | 0.5Na$_2$O · 0.5H$_2$O(0.2Co$_2$O$_3$ · 0.8Al$_2$O$_3$ · 0.25CaO) |
| 33 | Ir (0.6) | (3) | 0.4Na$_2$O · 0.5H$_2$O(0.2Ru$_2$O$_3$ · 0.8Al$_2$O$_3$ · 0.25CaO) |
| 34 | Ir (0.6) | (4) | 0.5Na$_2$O · 0.4H$_2$O(0.2Rh$_3$O$_3$ · 0.8Al$_2$O$_3$ · 0.25CaO) |
| 35 | Ir (0.6) | (5) | 0.5Na$_2$O · 0.5H$_2$O(0.2La$_2$O$_3$ · 0.8Al$_2$O$_3$ · 0.25CaO) |
| 36 | Ir (0.6) | (6) | 0.6Na$_2$O · 0.4H$_2$O(0.2Ce$_2$O$_3$ · 0.8Al$_2$O$_3$ · 0.25CaO) |
| 37 | Ir (0.6) | (7) | 0.5Na$_2$O · 0.6H$_2$O(0.2Ti$_2$O$_3$ · 0.8Al$_2$O$_3$ · 0.25CaO) |
| 38 | Ir (0.6) | (8) | 0.4Na$_2$O · 0.6H$_2$O(0.2V$_2$O$_3$ · 0.8Al$_2$O$_3$ · 0.25CaO) |
| 39 | Ir (0.6) | (9) | 0.5Na$_2$O · 0.6H$_2$O(0.2Cr$_2$O$_3$ · 0.8Al$_2$O$_3$ · 0.25CaO) |
| 40 | Ir (0.6) | (10) | 0.6Na$_2$O · 0.4H$_2$O(0.2Sb$_2$O$_3$ · 0.8Al$_2$O$_3$ · 0.25CaO) |
| 41 | Ir (0.6) | (11) | 0.6Na$_2$O · 0.5H$_2$O(0.2Ga$_2$O$_3$ · 0.8Al$_2$O$_3$ · 0.25CaO) |
| 42 | Ir (0.6) | (12) | 0.5Na$_2$O · 0.5H$_2$O(0.2Nb$_2$O$_3$ · 0.8Al$_2$O$_3$ · 0.25CaO) |
| 43 | Ir (0.6) | (13) | 0.5Na$_2$O · 0.6H$_2$O(0.2Fe$_2$O$_3$ · 0.8Al$_2$O$_3$ · 0.25MgO) |
| 44 | Ir (0.6) | (14) | 0.5Na$_2$O · 0.5H$_2$O(0.2Fe$_2$O$_3$ · 0.8Al$_2$O$_3$ · 0.25SrO) |
| 45 | Ir (0.6) | (15) | 0.5Na$_2$O · 0.5H$_2$O(0.2Fe$_2$O$_3$ · 0.8Al$_2$O$_3$ · 0.25CaO) |
| 46 | Ru (0.6) | 1 | S.L/0.5Na$_2$O · 0.5H$_2$O(0.2Fe$_2$O$_3$ · 0.8Al$_2$O$_3$ · 0.25CaO) |
| 47 | Rh (0.6) | 1 | " |
| 48 | Pd (0.6) | 1 | " |
| 49 | Os (0.6) | 1 | " |

TABLE B-continued

| Honeycomb Catalyst No. | Supported [1] Amount of Activator (wt %) | Crystalline Silicate No. | Composition [2] |
|---|---|---|---|
| 50 | Pt (0.6) | 1 | " |
| 51 | Ir (0.6) Al (2) | 1 | " |
| 52 | Ir (0.6) Ti (2) | 1 | " |
| 53 | Ir (0.6) Sn (2) | 1 | " |
| 54 | Ir (0.6) Cr (2) | 1 | " |
| 55 | Ir (0.6) Zr (2) | 1 | " |
| 56 | Ir (0.6) Co (2) | 1 | " |
| 57 | Ir (0.6) Mn (2) | 1 | " |
| 58 | Ir (0.6) Fe (2) | 1 | " |
| 59 | Ir (0.6) Ni (2) | 1 | " |
| 60 | Ir (0.6) Ca (2) | 1 | " |
| 61 | Ir (0.6) Mg (2) | 1 | " |
| 62 | Ir (0.6) Ba (2) | 1 | S.L/0.5Na$_2$O · 0.5H$_2$O(0.2Fe$_2$O$_3$ · 0.8Al$_2$O$_3$ · 0.25CaO) |
| 63 | Ir (0.6) Sr (2) | 1 | " |
| 64 | Ir (0.6) Cu (2) | 1 | " |
| 65 | Ir (0.6) Zn (2) | 1 | " |
| Comparison | | | |
| 66 | Ir (0.6) | | α-Al$_2$O$_3$ |
| 67 | Ru (0.6) | | " |
| 68 | Rh (0.6) | | " |
| 69 | Pd (0.6) | | " |
| 70 | Os (0.6) | | " |
| 71 | Pt (0.6) | | " |

Note:
[1] Amount of metal per amount of crystalline silicate
[2] S.L means silicalite. "25 SiO$_2$" present in the end of the composition formula is in common with all the formulas and is thus omitted.
** Numeral in ( ) means "Matrix Crystal No."

EXPERIMENTAL EXAMPLE 1

A test for estimating the activity of Honeycomb Catalysts 1 to 71, prepared in Examples 1, 2, 3, 4, 5 and 6 and Comparative Example 1, was carried out under the following estimation conditions:

GAS COMPOSITION

NO: 400 ppm; CO: 1000 ppm; C$_2$H$_4$: 1000 ppm; C$_3$H$_6$: 340 ppm; O$_2$: 8%; CO$_2$: 10%; H$_2$O: 10%; N$_2$: balance GHSV: 30000 h$^{-1}$;

SHAPE OF CATALYST 15 mm×15 mm×60 mm (144 cells)

The denitrification efficiency of the catalysts at the initial state of reaction temperatures of 350° C. and 450° C. is shown in Table C.

EXPERIMENTAL EXAMPLE 2

Honeycomb Catalysts 1 to 71 were subjected to an accelerated deterioration test in the rich atmosphere (reducing atmosphere) under the following accelerated deterioration conditions:

GAS COMPOSITION

H$_2$: 3%; H$_2$O: 10%; N$_2$: balance

GHSV: 5000 h$^{-1}$; Temperature: 700° C.; Gas Feeding Time: 6 hours

SHAPE OF CATALYST 15 mm×15 mm×60 mm (144 cells)

The Catalysts 1 to 71 treated under the above described accelerated deterioration conditions were then subjected to the test for estimating the activity under the activity estimation conditions of Example 1. The denitrification efficiency of the catalysts after the accelerated deterioration test at reaction temperatures of 350° C. and 450° C. is also shown in Table C. Thus, it is confirmed as shown in Table C that the catalysts 1 to 65 of the present invention are capable of maintaining higher the catalytic activity even in high temperature reducing atmospheres.

TABLE C

| Honeycomb Catalyst No. | Supported Amount of Activator (wt %) | NO x Conversion Efficiency (%) (Initial State) 350° C. | 450° C. | NO x Conversion Efficiency (%) (After Accelerated Deterioration) 350° C. | 450° C. |
|---|---|---|---|---|---|
| 1 | Ir (0.6) | 41 | 36 | 36 | 34 |
| 2 | Ir (0.6) | 43 | 38 | 38 | 34 |
| 3 | Ir (0.6) | 44 | 39 | 39 | 33 |
| 4 | Ir (0.6) | 44 | 36 | 37 | 35 |
| 5 | Ir (0.6) | 42 | 41 | 38 | 33 |
| 6 | Ir (0.6) | 42 | 38 | 38 | 34 |
| 7 | Ir (0.6) | 43 | 36 | 40 | 35 |
| 8 | Ir (0.6) | 41 | 38 | 34 | 33 |
| 9 | Ir (0.6) | 42 | 36 | 39 | 37 |
| 10 | Ir (0.6) | 42 | 38 | 38 | 33 |
| 11 | Ir (0.6) | 42 | 37 | 36 | 33 |
| 12 | Ir (0.6) | 40 | 39 | 35 | 32 |
| 13 | Ir (0.6) | 41 | 40 | 33 | 33 |
| 14 | Ir (0.6) | 44 | 40 | 34 | 34 |
| 15 | Ir (0.6) | 43 | 39 | 41 | 36 |
| 16 | Ir (0.6) | 41 | 37 | 40 | 32 |
| 17 | Ir (0.6) | 40 | 38 | 38 | 36 |
| 18 | Ir (0.6) | 40 | 37 | 40 | 37 |
| 19 | Ir (0.6) | 41 | 40 | 38 | 38 |
| 20 | Ir (0.6) | 42 | 38 | 40 | 35 |
| 21 | Ir (0.6) | 43 | 36 | 38 | 34 |
| 22 | Ir (0.6) | 41 | 38 | 36 | 36 |
| 23 | Ir (0.6) | 39 | 36 | 35 | 38 |
| 24 | Ir (0.6) | 38 | 37 | 36 | 36 |
| 25 | Ir (0.6) | 36 | 34 | 36 | 32 |
| 26 | Ir (0.6) | 36 | 35 | 31 | 32 |
| 27 | Ir (0.6) | 35 | 37 | 32 | 31 |
| 28 | Ir (0.6) | 35 | 34 | 36 | 31 |
| 29 | Ir (0.6) | 35 | 36 | 36 | 31 |
| 30 | Ir (0.6) | 38 | 36 | 35 | 33 |
| 31 | Ir (0.6) | 40 | 38 | 39 | 37 |
| 32 | Ir (0.6) | 41 | 39 | 40 | 38 |
| 33 | Ir (0.6) | 42 | 40 | 40 | 39 |
| 34 | Ir (0.6) | 41 | 38 | 40 | 37 |
| 35 | Ir (0.6) | 39 | 37 | 39 | 37 |
| 36 | Ir (0.6) | 40 | 41 | 40 | 40 |
| 37 | Ir (0.6) | 38 | 37 | 36 | 37 |
| 38 | Ir (0.6) | 39 | 38 | 38 | 38 |
| 39 | Ir (0.6) | 39 | 37 | 38 | 37 |
| 40 | Ir (0.6) | 39 | 38 | 40 | 38 |
| 41 | Ir (0.6) | 40 | 38 | 39 | 38 |
| 42 | Ir (0.6) | 41 | 39 | 40 | 38 |
| 43 | Ir (0.6) | 42 | 40 | 38 | 38 |
| 44 | Ir (0.6) | 40 | 38 | 38 | 38 |
| 45 | Ir (0.6) | 39 | 38 | 38 | 38 |
| 46 | Ru (0.6) | 25 | 30 | 30 | 30 |
| 47 | Rh (0.6) | 28 | 26 | 26 | 32 |
| 48 | Pd (0.6) | 26 | 20 | 27 | 20 |
| 49 | Os (0.6) | 24 | 20 | 28 | 20 |
| 50 | Pt (0.6) | 35 | 21 | 30 | 33 |
| 51 | Ir (0.6), Al (2) | 41 | 33 | 38 | 33 |
| 52 | Ir (0.6), Ti (2) | 38 | 34 | 34 | 34 |
| 53 | Ir (0.6), Sn (2) | 39 | 33 | 36 | 32 |
| 54 | Ir (0.6), Cr (2) | 38 | 36 | 36 | 34 |
| 55 | Ir (0.6), Zr (2) | 36 | 35 | 35 | 31 |
| 56 | Ir (0.6), Co (2) | 35 | 34 | 34 | 30 |
| 57 | Ir (0.6), Mn (2) | 36 | 33 | 34 | 32 |
| 58 | Ir (0.6), Fe (2) | 37 | 34 | 35 | 33 |
| 59 | Ir (0.6), Ni (2) | 37 | 35 | 36 | 34 |
| 60 | Ir (0.6), Ca (2) | 36 | 35 | 35 | 33 |
| 61 | Ir (0.6), Mg (2) | 35 | 34 | 36 | 32 |
| 62 | Ir (0.6), Ba (2) | 34 | 35 | 37 | 30 |
| 63 | Ir (0.6), Sr (2) | 39 | 37 | 33 | 32 |
| 64 | Ir (0.6), Cu (2) | 41 | 37 | 35 | 32 |
| 65 | Ir (0.6), Zn (2) | 41 | 38 | 28 | 34 |
| Comparison | | | | | |
| 66 | Ir (0.6) | 33 | 26 | 16 | 12 |
| 67 | Ru (0.6) | 25 | 20 | 5 | 3 |
| 68 | Rh (0.6) | 23 | 18 | 7 | 2 |
| 69 | Pd (0.6) | 21 | 18 | 6 | 4 |
| 70 | Os (0.6) | 18 | 16 | 6 | 3 |
| 71 | Pt (0.6) | 36 | 18 | 8 | 0 |

EXAMPLE 7

Honeycomb Coated Article 1 obtained in Example 1 was immersed in an aqueous solution of iridium chloride and cerium chloride ($IrCl_4 \cdot H_2O$ 2.88 g+$CeCl_3$ 10 g/200 cc $H_2O$), impregnated therewith for 1 hour, subjected to wiping-off of the liquid adhered to the substrate and dried at 200° C., followed by a purging treatment in a nitrogen atmosphere for 12 hours, thus obtaining Honeycomb Catalyst 72.

EXAMPLE 8

Honeycomb Coated Articles 2 to 15 obtained in Examples 2 were immersed in an aqueous solution of iridium Chloride and cerium chloride and treated in an analogous manner to Example 7 to obtain Honeycomb Catalysts 73 to 86.

EXAMPLE 9

Using Matrix Crystals 1 to 15 obtained in Examples 1 and 2, H-type Crystalline Silicates 16 to 30 were obtained in an analogous manner to Example 1 and further treated in the similar step to that for the preparation of the catalyst of Example 7 to obtain Honeycomb Coated Articles 16 to 30 and Honeycomb Catalysts 87 to 101.

EXAMPLE 10

Matrix Crystals 1 to 15 obtained in Examples 1 and 2 (no formation of laminar composite crystal, nor ion exchange) were coated on a monolithic substrate for coordielite, thus obtaining Honeycomb Coated Articles 31 to 45, which were then immersed in the aqueous solution of iridium chloride and cerium chloride in the similar manner to Example 7, thus obtaining Honeycomb Catalysts 102 to 116.

EXAMPLE 11

Honeycomb Coated Article 1 coated with Laminar Composite Crystalline Silicate 1 obtained in Example 1 was immersed in each of aqueous solutions of lanthanum chloride ($LaCl_3 \cdot 6H_2O$ 10 g/$H_2O$ 200 cc), praseodymium chloride ($PrCl_3 \cdot 7H_2O$ 10 g/$H_2O$ 200 cc), neodymium chloride ($NdCl_3 \cdot 6H_2O$ 10 g/$H_2O$ 200 cc), samarium chloride ($SmCl_3 \cdot 6H_2O$ 10 g/$H_2O$ 200 cc) and europium chloride ($EuCl_3$ 10 g/$H_2O$ 200 cc) and then subjected to formation of the catalysts in an analogous manner to Example 7, thus obtaining Honeycomb Catalysts 117 to 121.

COMPARATIVE EXAMPLE 2

Only iridium was supported on $\alpha$-$Al_2O_3$ in Example 7 to obtain Catalyst and iridium and cerium were supported on $\alpha$-$Al_2O_3$ in an analogous manner to Example 7 to prepare Honeycomb Catalyst 123.

The constructions of the catalysts of Examples of the present invention and Comparative Examples are shown in Tables D:

TABLE D

| Honeycomb Catalyst No. | Supported [1] Amount of Activator (wt %) | No. | Crystalline Silicate Composition [2] |
|---|---|---|---|
| 72 | Ir (0.6), Ce(4) | 1 | SJ/0.5Na$_2$O · 0.5H$_2$O(0.2Fe$_2$O$_3$ · 0.8Al$_2$O$_3$ · 0.25CaO) |
| 73 | Ir (0.6), Ce(4) | 2 | SJ/0.5Na$_2$O · 0.5H$_2$O(0.2Co$_2$O$_3$ · 0.8Al$_2$O$_3$ · 0.25CaO) |
| 74 | Ir (0.6), Ce(4) | 3 | SJ/0.4Na$_2$O · 0.5H$_2$O(0.2Ru$_2$O$_3$ · 0.8Al$_2$O$_3$ · 0.25CaO) |
| 75 | Ir (0.6), Ce(4) | 4 | SJ/0.5Na$_2$O · 0.4H$_2$O(0.2Rh$_2$O$_3$ · 0.8Al$_2$O$_3$ · 0.25CaO) |
| 76 | Ir (0.6), Ce(4) | 5 | SJ/0.5Na$_2$O · 0.5H$_2$O(0.2La$_2$O$_3$ · 0.8Al$_2$O$_3$ · 0.25CaO) |
| 77 | Ir (0.6), Ce(4) | 6 | SJ/0.6Na$_2$O · 0.4H$_2$O(0.2Ce$_2$O$_3$ · 0.8Al$_2$O$_3$ · 0.25CaO) |
| 78 | Ir (0.6), Ce(4) | 7 | SJ/0.5Na$_2$O · 0.6H$_2$O(0.2Ti$_2$O$_3$ · 0.8Al$_2$O$_3$ · 0.25CaO) |
| 79 | Ir (0.6), Ce(4) | 8 | SJ/0.4Na$_2$O · 0.6H$_2$O(0.2V$_2$O$_3$ · 0.8Al$_2$O$_3$ · 0.25CaO) |
| 80 | Ir (0.6), Ce(4) | 9 | SJ/0.5Na$_2$O · 0.6H$_2$O(0.2Cr$_2$O$_3$ · 0.8Al$_2$O$_3$ · 0.25CaO) |
| 81 | Ir (0.6), Ce(4) | 10 | SJ/0.6Na$_2$O · 0.4H$_2$O(0.2Sb$_2$O$_3$ · 0.8Al$_2$O$_3$ · 0.25CaO) |
| 82 | Ir (0.6), Ce(4) | 11 | SJ/0.6Na$_2$O · 0.5H$_2$O(0.2Ga$_2$O$_3$ · 0.8Al$_2$O$_3$ · 0.25CaO) |
| 83 | Ir (0.6), Ce(4) | 12 | SJ/0.5Na$_2$O · 0.5H$_2$O(0.2Nb$_2$O$_3$ · 0.8Al$_2$O$_3$ · 0.25CaO) |
| 84 | Ir (0.6), Ce(4) | 13 | SJ/0.5Na$_2$O · 0.5H$_2$O(0.2Fe$_2$O$_3$ · 0.8Al$_2$O$_3$ · 0.25MgO) |
| 85 | Ir (0.6), Ce(4) | 14 | SJ/0.5Na$_2$O · 0.5H$_2$O(0.2Fe$_2$O$_3$ · 0.8Al$_2$O$_3$ · 0.25SrO) |
| 86 | Ir (0.6), Ce(4) | 15 | SJ/0.5Na$_2$O · 0.5H$_2$O(0.2Fe$_2$O$_3$ · 0.8Al$_2$O$_3$ · 0.25BaO) |
| 87 | Ir (0.6), Ce(4) | 16 | 0.5Na$_2$O · 0.5H$_2$O(0.2Fe$_2$O$_3$ · 0.8Al$_2$O$_3$ · 0.25CaO) |
| 88 | Ir (0.6), Ce(4) | 17 | 0.5Na$_2$O · 0.5H$_2$O(0.2Co$_2$O$_3$ · 0.8Al$_2$O$_3$ · 0.25CaO) |
| 89 | Ir (0.6), Ce(4) | 18 | 0.4Na$_2$O · 0.5H$_2$O(0.2Ru$_2$O$_3$ · 0.8Al$_2$O$_3$ · 0.25CaO) |
| 90 | Ir (0.6), Ce(4) | 19 | 0.5Na$_2$O · 0.4H$_2$O(0.2Rh$_2$O$_3$ · 0.8Al$_2$O$_3$ · 0.25CaO) |
| 91 | Ir (0.6), Ce(4) | 20 | 0.5Na$_2$O · 0.5H$_2$O(0.2La$_2$O$_3$ · 0.8Al$_2$O$_3$ · 0.25CaO) |
| 92 | Ir (0.6), Ce(4) | 21 | 0.6Na$_2$O · 0.4H$_2$O(0.2Ce$_2$O$_3$ · 0.8Al$_2$O$_3$ · 0.25CaO) |
| 93 | Ir (0.6), Ce(4) | 22 | 0.5Na$_2$O · 0.6H$_2$O(0.2Ti$_2$O$_3$ · 0.8Al$_2$O$_3$ · 0.25CaO) |
| 94 | Ir (0.6), Ce(4) | 23 | 0.4Na$_2$O · 0.6H$_2$O(0.2V$_2$O$_3$ · 0.8Al$_2$O$_3$ · 0.25CaO) |
| 95 | Ir (0.6), Ce(4) | 24 | 0.5Na$_2$O · 0.6H$_2$O(0.2Cr$_2$O$_3$ · 0.8Al$_2$O$_3$ · 0.25CaO) |
| 96 | Ir (0.6), Ce(4) | 25 | 0.6Na$_2$O · 0.4H$_2$O(0.2Sb$_2$O$_3$ · 0.8Al$_2$O$_3$ · 0.25CaO) |
| 97 | Ir (0.6), Ce(4) | 26 | 0.6Na$_2$O · 0.5H$_2$O(0.2Ga$_2$O$_3$ · 0.8Al$_2$O$_3$ · 0.25CaO) |
| 98 | Ir (0.6), Ce(4) | 27 | 0.5Na$_2$O · 0.5H$_2$O(0.2Nb$_2$O$_3$ · 0.8Al$_2$O$_3$ · 0.25CaO) |
| 99 | Ir (0.6), Ce(4) | 28 | 0.5Na$_2$O · 0.5H$_2$O(0.2Fe$_2$O$_3$ · 0.8Al$_2$O$_3$ · 0.25MgO) |
| 100 | Ir (0.6), Ce(4) | 29 | 0.5Na$_2$O · 0.5H$_2$O(0.2Fe$_2$O$_3$ · 0.8Al$_2$O$_3$ · 0.25SrO) |
| 101 | Ir (0.6), Ce(4) | 30 | 0.5Na$_2$O · 0.5H$_2$O(0.2Fe$_2$O$_3$ · 0.8Al$_2$O$_3$ · 0.25BaO) |
| 102 | Ir (0.6), Ce(4) | (1)** | 0.5Na$_2$O · 0.5H$_2$O(0.2Fe$_2$O$_3$ · 0.8Al$_2$O$_3$ · 0.25CaO) |
| 103 | Ir (0.6), Ce(4) | (2) | 0.5Na$_2$O · 0.5H$_2$O(0.2Co$_2$O$_3$ · 0.8Al$_2$O$_3$ · 0.25CaO) |
| 104 | Ir (0.6), Ce(4) | (3) | 0.4Na$_2$O · 0.5H$_2$O(0.2Ru$_2$O$_3$ · 0.8Al$_2$O$_3$ · 0.25CaO) |
| 105 | Ir (0.6), Ce(4) | (4) | 0.5Na$_2$O · 0.4H$_2$O(0.2Rh$_2$O$_3$ · 0.8Al$_2$O$_3$ · 0.25CaO) |
| 106 | Ir (0.6), Ce(4) | (5) | 0.5Na$_2$O · 0.5H$_2$O(0.2La$_2$O$_3$ · 0.8Al$_2$O$_3$ · 0.25CaO) |
| 107 | Ir (0.6), Ce(4) | (6) | 0.6Na$_2$O · 0.4H$_2$O(0.2Ce$_2$O$_3$ · 0.8Al$_2$O$_3$ · 0.25CaO) |
| 108 | Ir (0.6), Ce(4) | (7) | 0.5Na$_2$O · 0.6H$_2$O(0.2Ti$_2$O$_3$ · 0.8Al$_2$O$_3$ · 0.25CaO) |
| 109 | Ir (0.6), Ce(4) | (8) | 0.4Na$_2$O · 0.6H$_2$O(0.2V$_2$O$_3$ · 0.8Al$_2$O$_3$ · 0.25CaO) |
| 110 | Ir (0.6), Ce(4) | (9) | 0.5Na$_2$O · 0.6H$_2$O(0.2Cr$_2$O$_3$ · 0.8Al$_2$O$_3$ · 0.25CaO) |
| 111 | Ir (0.6), Ce(4) | (10) | 0.6Na$_2$O · 0.4H$_2$O(0.2Sb$_2$O$_3$ · 0.8Al$_2$O$_3$ · 0.25CaO) |
| 112 | Ir (0.6), Ce(4) | (11) | 0.6Na$_2$O · 0.5H$_2$O(0.2Ga$_2$O$_3$ · 0.8Al$_2$O$_3$ · 0.25CaO) |
| 113 | Ir (0.6), Ce(4) | (12) | 0.5Na$_2$O · 0.5H$_2$O(0.2Nb$_2$O$_3$ · 0.8Al$_2$O$_3$ · 0.25CaO) |
| 114 | Ir (0.6), Ce(4) | (13) | 0.5Na$_2$O · 0.5H$_2$O(0.2Fe$_2$O$_3$ · 0.8Al$_2$O$_3$ · 0.25MgO) |
| 115 | Ir (0.6), Ce(4) | (14) | 0.5Na$_2$O · 0.5H$_2$O(0.2Fe$_2$O$_3$ · 0.8Al$_2$O$_3$ · 0.25SrO) |
| 116 | Ir (0.6), Ce(4) | (15) | 0.5Na$_2$O · 0.5H$_2$O(0.2Fe$_2$O$_3$ · 0.8Al$_2$O$_3$ · 0.25BaO) |
| 117 | Ir (0.6), La(4) | 1 | SJ/0.5Na$_2$O · 0.5H$_2$O(0.2Fe$_2$O$_3$ · 0.8Al$_2$O$_3$ · 0.25CaO) |
| 118 | Ir (0.6), Pr(4) | 1 | " |
| 119 | Ir (0.6), Nd(4) | 1 | " |
| 120 | Ir (0.6), Sm(4) | 1 | " |
| 121 | Ir (0.6), Eu(4) | 1 | " |
| 122 | Ir (0.6) | — | α-Al$_2$O$_3$ |
| 123 | Ir (0.6), Ce(4) | — | " |

Note:
[1] same as in Table B
[2] same as in Table B
** same as in Table B

EXPERIMENTAL EXAMPLE 3

A test for estimating the activity of Honeycomb Catalysts 72 to 123, prepared in Examples 7, 8, 9, 10 and 11, and Comparative Example 2 was carried out under the following activity estimation conditions:

GAS COMPOSITION

NO: 400 ppm; CO: 1000 ppm; C$_2$H$_4$: 1000 ppm; C$_3$H$_6$: 340 ppm;
O$_2$: 8%; CO$_2$: 10%; H$_2$O: 10%; N$_2$: balance
GHSV: 30000 h$^{-1}$;

SHAPE OF CATALYST 15 mm×15 mm×60 mm (144 cells)

The denitrification efficiency of the catalysts at the initial state of reaction temperatures of 350° C. and 450° C. is shown in Table E.

EXPERIMENTAL EXAMPLE 4

Honeycomb Catalysts 72 to 123 were subjected to an accelerated deterioration test in the rich atmosphere (reducing atmosphere) under the following accelerated deterioration conditions:

GAS COMPOSITION

H$_2$: 3%; H$_2$O: 10%; N$_2$: balance
GHSV: 5000 h$^{-1}$; Temperature: 700° C.; Gas Feeding Time: 6 hours

SHAPE OF CATALYST 15 mm×15 mm×60 mm (144 cells)

The Catalysts 72 to 123 treated under the above described accelerated deterioration conditions were then subjected to the test for estimating the activity. The denitrification efficiency of the catalysts after the accelerated deterioration test at reaction temperatures of 350° C. and 450° C. is also shown in Table E. Thus, it is confirmed as shown in Table E that the catalysts 72 to 121 of the present invention are capable of maintaining higher the catalytic activity even in high temperature reducing atmospheres.

TABLE E

| Honeycomb Catalyst No. | Supported Amount of Activator (wt %) | NO × Conversion Efficiency (%) (Initial State) | | NO × Conversion Efficiency (%) (After Accelerated Deterioration) | |
|---|---|---|---|---|---|
| | | 350° C. | 450° C. | 350° C. | 450° C. |
| 72 | Ir (0.6), Ce (4) | 61 | 36 | 56 | 34 |
| 73 | Ir (0.6), Ce (4) | 63 | 38 | 58 | 34 |
| 74 | Ir (0.6), Ce (4) | 64 | 39 | 60 | 33 |
| 75 | Ir (0.6), Ce (4) | 64 | 36 | 60 | 35 |
| 76 | Ir (0.6), Ce (4) | 42 | 41 | 58 | 33 |
| 77 | Ir (0.6), Ce (4) | 62 | 38 | 58 | 34 |
| 78 | Ir (0.6), Ce (4) | 63 | 36 | 60 | 35 |
| 79 | Ir (0.6), Ce (4) | 61 | 38 | 60 | 33 |
| 80 | Ir (0.6), Ce (4) | 62 | 36 | 62 | 37 |
| 81 | Ir (0.6), Ce (4) | 62 | 38 | 58 | 33 |
| 82 | Ir (0.6), Ce (4) | 62 | 37 | 56 | 33 |
| 83 | Ir (0.6), Ce (4) | 58 | 39 | 55 | 32 |
| 84 | Ir (0.6), Ce (4) | 61 | 40 | 53 | 33 |
| 85 | Ir (0.6), Ce (4) | 61 | 40 | 54 | 34 |
| 86 | Ir (0.6). Ce (4) | 63 | 39 | 54 | 36 |
| 87 | Ir (0.6), Ce (4) | 61 | 37 | 60 | 32 |
| 88 | Ir (0.6), Ce (4) | 60 | 38 | 58 | 36 |
| 89 | Ir (0.6), Ce (4) | 60 | 37 | 60 | 37 |
| 90 | Ir (0.6), Ce (4) | 61 | 40 | 58 | 38 |
| 91 | Ir (0.6), Ce (4) | 62 | 38 | 60 | 35 |
| 92 | Ir (0.6), Ce (4) | 63 | 36 | 58 | 34 |
| 93 | Ir (0.6), Ce (4) | 61 | 38 | 58 | 36 |
| 94 | Ir (0.6), Ce (4) | 60 | 36 | 55 | 38 |
| 95 | Ir (0.6), Ce (4) | 61 | 37 | 66 | 36 |
| 96 | Ir (0.6), Ce (4) | 66 | 34 | 64 | 32 |
| 97 | Ir (0.6), Ce (4) | 66 | 35 | 61 | 32 |
| 98 | Ir (0.6), Ce (4) | 65 | 37 | 61 | 31 |
| 99 | Ir (0.6), Ce (4) | 55 | 34 | 66 | 31 |
| 100 | Ir (0.6), Ce (4) | 55 | 36 | 56 | 31 |
| 101 | Ir (0.6), Ce (4) | 58 | 36 | 65 | 33 |
| 102 | Ir (0.6), Ce (4) | 40 | 38 | 39 | 37 |
| 103 | Ir (0.6), Ce (4) | 41 | 39 | 39 | 38 |
| 104 | Ir (0.6), Ce (4) | 40 | 40 | 40 | 40 |
| 105 | Ir (0.6), Ce (4) | 41 | 37 | 40 | 37 |
| 106 | Ir (0.6), Ce (4) | 39 | 37 | 38 | 37 |
| 107 | Ir (0.6), Ce (4) | 39 | 42 | 40 | 41 |
| 108 | Ir (0.6), Ce (4) | 38 | 37 | 37 | 36 |
| 109 | Ir (0.6), Ce (4) | 39 | 38 | 38 | 38 |
| 110 | Ir (0.6), Ce (4) | 38 | 37 | 38 | 37 |
| 111 | Ir (0.6), Ce (4) | 39 | 37 | 40 | 37 |
| 112 | Ir (0.6), Ce (4) | 39 | 38 | 39 | 39 |
| 113 | Ir (0.6), Ce (4) | 41 | 38 | 40 | 37 |
| 114 | Ir (0.6), Ce (4) | 41 | 40 | 39 | 38 |
| 115 | Ir (0.6), Ce (4) | 40 | 39 | 38 | 38 |
| 116 | Ir (0.6), Ce (4) | 38 | 38 | 38 | 39 |
| 117 | Ir (0.6), La (4) | 58 | 30 | 60 | 30 |
| 118 | Ir (0.6), Pr (4) | 60 | 26 | 60 | 32 |
| 119 | Ir (0.6), Nd (4) | 62 | 20 | 62 | 20 |
| 120 | Ir (0.6), Sm (4) | 60 | 20 | 62 | 20 |
| 121 | Ir (0.6), Eu (4) | 61 | 21 | 62 | 33 |
| Comparison | | | | | |
| 122 | Ir (0.6) | 20 | 20 | 10 | 8 |
| 123 | Ir (0.6), Ce (4) | 18 | 18 | 8 | 8 |

UTILITY AND POSSIBILITY IN INDUSTRY

As illustrated above, the catalyst for purifying an exhaust gas according to the present invention is a stable catalyst excellent in durability, which can be used as a catalyst for purifying an exhaust gas of a lean burn engine of a gasoline car or a diesel engine.

We claim:

1. A catalyst for purifying an exhaust gas, comprising a crystalline silicate having an X-ray diffraction pattern represented by Table A and having a chemical composition represented by the following chemical formula in terms of mole ratios of oxides in a dehydrated state, $$(1+0.8)R_2O \cdot [aM_2O_3 \cdot bM'O \cdot cAl_2O_3] \cdot ySiO_2$$

in which R is at least one of alkali metal ions and hydrogen ion M is at least one ion selected from the group consisting of Group VIII elements of the Periodic Table, rare earth elements, titanium, chromium, niobium and antimony, M' is an alkaline earth metal ion selected from the group consisting of magnesium, calcium, strontium and barium ions, a>0, 20>b≧0, a+c=1 and 3000>y>11, on which a platinum group metal consisting iridium is supported, wherein the crystalline silicate is a laminar composite crystalline silicate consisting of a previously synthesized crystalline silicate as a matrix crystal, on the outer surface of which a crystalline silicate consisting of Si and O and having the same crystalline structure as the matrix crystal is grown.

2. The catalyst for purifying an exhaust gas according to claim 1, wherein at least one further metal selected from the group consisting of titanium, zirconium, chromium, manganese, iron, cobalt, zinc, aluminum, tin, nickel, copper, calcium, magnesium, strontium and barium is supported on the crystalline silicate.

3. A process for the production of a catalyst for purifying an exhaust gas, which comprises immersing a crystalline silicate having an X-ray diffraction pattern represented by Table A and a chemical composition represented by the following chemical formula in terms of mole ratios of oxides in a dehydrated state $$(1±0.8)R_2O \cdot [aM_2O_3 \cdot bM'O \cdot cAl_2O_3] \cdot ySiO_2$$

in which R is at least one of alkali metal ions and hydrogen ion, M is at least one elementary ion selected from the group consisting of Group VIII elements of Periodic Table, rare earth elements, titanium, vanadium, chromium, niobium, antimony and gallium, M' is an alkaline earth metal ion selected from the group consisting of magnesium, calcium, strontium and barium ions, a>0, 20>b≧0, a+c=1 and 3000>y>11, in an aqueous solution of a salt of (I) iridium or (II) iridium and at least one metal selected from rare earth elements and supporting the metal(s) On the silicate by an ion exchange method or impregnation method.

4. A catalyst for purifying an exhaust gas, comprising a crystalline silicate having an X-ray diffraction pattern represented by Table A and having a chemical composition represented by the following chemical formula in terms of mole ratios of oxides in a dehydrated state, $$(1±0.8)R_2O \cdot [aM_2O_3 \cdot bM'O \cdot cAl_2O_3] \cdot ySiO_2$$

in which R is at least one of alkali metal ions and hydrogen ion, M is at least one elementary ion selected from the group consisting of Group VIII elements of Periodic Table, rare earth elements, titanium, chromium, niobium and antimony, M' is an alkaline earth metal ion selected from the group consisting of magnesium, calcium, strontium and barium ions, a>0, 20>b≧0, a+c=1 and 3000>y>11, on which iridium and at least one further metal selected from the group consisting of titanium, zirconium, chromium, manganese, iron, cobalt, zinc, aluminum, tin, nickel, copper, calcium, magnesium, strontium and barium is supported, and wherein the crystalline silicate is a laminar composite crystalline silicate consisting of a previously synthesized crystalline silicate as a matrix crystal, on the outer surface of which a crystalline silicate consisting of Si and O and having the same crystalline structure as the matrix crystal are grown.

* * * * *